United States Patent
Kawashima et al.

(10) Patent No.: US 7,682,880 B2
(45) Date of Patent: Mar. 23, 2010

(54) METHOD AND DEVICE FOR PRODUCING LAYOUT PATTERNS OF A SEMICONDUCTOR DEVICE HAVING AN EVEN WAFER SURFACE

(75) Inventors: Hidekazu Kawashima, Kanagawa (JP); Tetsuya Katoh, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 366 days.

(21) Appl. No.: 11/717,730

(22) Filed: Mar. 14, 2007

(65) Prior Publication Data
US 2007/0155061 A1    Jul. 5, 2007

Related U.S. Application Data

(62) Division of application No. 10/755,387, filed on Jan. 13, 2004, now Pat. No. 7,208,350.

(30) Foreign Application Priority Data
Jan. 14, 2003    (JP)    ............................. 2003-005505

(51) Int. Cl.
  H01L 21/82    (2006.01)
  G06F 17/50    (2006.01)
(52) U.S. Cl. ........................... 438/129; 438/130; 716/8; 716/12
(58) Field of Classification Search ................. 438/129, 438/130; 716/8, 12
See application file for complete search history.

(56) References Cited

U.S. PATENT DOCUMENTS

| | | | |
|---|---|---|---|
| 5,740,173 | A | 4/1998 | Fiorini |
| 6,054,872 | A | 4/2000 | Fudanuki et al. |
| 6,291,870 | B1 | 9/2001 | Kawashima et al. |
| 6,307,222 | B1 | 10/2001 | Brunolli et al. |
| 6,335,640 | B1 | 1/2002 | Okamoto |
| 6,467,074 | B1 | 10/2002 | Katsioulas et al. |
| 6,553,553 | B2 | 4/2003 | Komaki |
| 6,594,809 | B2 | 7/2003 | Wang et al. |
| 7,076,756 | B2 | 7/2006 | Ichimiya |
| 7,137,092 | B2 | 11/2006 | Maeda |
| 2001/0018757 | A1 | 8/2001 | Morikawa |
| 2001/0054720 | A1 | 12/2001 | Brunolli et al. |
| 2004/0163068 | A1 | 8/2004 | Fukita et al. |
| 2005/0285146 | A1 | 12/2005 | Iwasaki |

(Continued)

FOREIGN PATENT DOCUMENTS

JP    11-176941    7/1999

(Continued)

OTHER PUBLICATIONS

Japanese Office Action dated Sep. 29, 2009 and partial English translation thereof.

*Primary Examiner*—M. Wilczewski
(74) *Attorney, Agent, or Firm*—McGinn IP Law Group, PLLC

(57) ABSTRACT

Primitive cells, which are circuit patterns of the constituent elements of a semiconductor device, are arranged in the element formation area of a semiconductor device, and at least one fill cell with a diffusion layer and no wiring, is arranged in the vacant areas that are generated in the element formation area after the primitive cells have been arranged.

5 Claims, 5 Drawing Sheets

U.S. PATENT DOCUMENTS

| | | |
|---|---|---|
| 2006/0131609 A1 | 6/2006 | Kinoshita et al. |
| 2007/0252217 A1* | 11/2007 | Oki .......................... 257/369 |
| 2008/0023792 A1* | 1/2008 | Liu et al. .................. 257/532 |
| 2009/0093099 A1* | 4/2009 | Kobayashi ................ 438/403 |

FOREIGN PATENT DOCUMENTS

| | | | |
|---|---|---|---|
| JP | 2000-349143 | | 12/2000 |
| JP | 2001-358221 | | 12/2001 |
| JP | 2004-47643 | | 2/2004 |
| JP | 2004-221231 | * | 8/2004 |
| JP | 2005-340461 | | 12/2005 |
| JP | 2007-27290 | * | 2/2007 |

\* cited by examiner

METHOD AND DEVICE FOR PRODUCING LAYOUT PATTERNS OF A SEMICONDUCTOR DEVICE HAVING AN EVEN WAFER SURFACE

The present Application is a Divisional Application of U.S. patent application Ser. No. 10/755,38, filed on Jan. 13, 2004 now U.S. Pat. No. 7,208,350.

BACKGROUND OF THE INVENTION

1. Field of the Invention

The present invention relates to a method and device for producing a layout pattern of a semiconductor device.

2. Description of the Related Art

Recent fabrication methods of semiconductor devices are described below. First, wells are formed close to the wafer surface and impurities are injected into the wells to form diffusion layers. Thereafter trenches are formed in element isolation areas for isolating each element. An oxide film (insulating film) is then formed by a well-known CVD (Chemical Vapor Deposition) method over the entire surface of the wafer including the interiors of the trenches. The surface of the formed oxide film is uneven, that is, is higher at the diffusion layers and lower at the trenches. A known CMP (Chemical Mechanical Polishing) method is then carried out to planarize the wafer surface, so that the oxide film of the wafer surface is removed to expose the surface of the diffusion layers. At this time, polishing proceeds further in regions of the wafer surface having few diffusion layers than in areas having many diffusion layers, raising the problem of excessive abrasion of the wafer surface. In other words, there is the problem that the amount of abrasion of the wafer surface differs depending on the distribution of the diffusion layers.

These problems in processing the wafer surface accompany miniaturization of semiconductor devices. In semiconductor devices of the prior art in which sufficient separation was provided between diffusion layers and between trenches to prevent unevenness in the oxide film surface from adversely affecting subsequent processes, planarization was not required and the above-described problem did not occur.

One known and typical method for creating a layout pattern of a semiconductor device involves arranging fill cells (also referred to as "dummy cells"), composed only of wells, in vacant areas that lack circuit patterns. In this method, a semiconductor device is fabricated by making mask data from a layout pattern that includes fill cells, fabricating a reticle based on this mask data, and then forming diffusion layers or wiring layers by using the reticle. Nevertheless, such an arrangement of fill cells composed only of wells in vacant areas cannot solve the above-described problems in processing the wafer surface.

In order to solve the aforementioned problems in processing the wafer surface, it is contemplated that, after creating the layout pattern of a semiconductor device, dummy data of diffusion layers are inserted in a mask data of areas having few diffusion layers when making mask data, whereby the distribution of diffusion layers is made uniform. However, a method in which dummy data are added to the mask data when making mask data is problematic because the distribution of diffusion layers and the size of vacant areas must be calculated from the layout pattern, and this calculation entails complex arithmetic processes and an excessive amount of processing time.

In addition, a method is also known in which the fill cells arranged in vacant areas have the same construction as transistors with gate electrodes. For example, Japanese Patent Laid-Open Publication No. 176941/99 (hereinbelow referred to as "Patent Document 1") discloses a construction in which dummy cells with wiring are arranged in vacant areas that is generated after each of the constituent elements of the semiconductor device have been arranged. In Patent Document 1, dummy cells with wiring such that the wiring data ratio (the wiring data ratio being the proportion of the wiring area) falls within a prescribed range, are arranged in vacant areas. This arrangement is directed toward solving the problem that a low wiring data ratio prevents the accurate formation of a wiring pattern when forming wiring. In other words, Patent Document 1 addresses problems relating to the distribution of wiring formed on the upper layer of a wafer after transistors have been formed on the wafer. The dummy cells used in Patent Document 1 include p-channel MOS transistors and n-channel MOS transistors and therefore contain diffusion layers. However, since the problem addressed by Patent Document 1 is the distribution of wiring such as gate electrodes as described above, there is no disclosure regarding the significance of the distribution of diffusion layers in Patent Document 1.

SUMMARY OF THE INVENTION

It is an object of the present invention to provide a method and device for producing the layout pattern of a semiconductor device that enables uniform planarization of the wafer surface in the CMP processing carried out before forming transistors, and further, that enables a reduction of trouble of the arithmetic processes when producing mask data.

In the present invention, in order to achieve the above-described objects, primitive cells, which are circuit patterns corresponding to each of the constituent elements of the semiconductor device, are arranged in the element formation area of the semiconductor device, and at least one fill cell with a diffusion layer and no wiring is arranged in vacant area that is generated in the element formation area after all primitive cells have been arranged. Since the fill cells are arranged so as to make the data ratio of the diffusion layer (area ratio of the diffusion layer) falls within a prescribed range, uneven distribution of the diffusion layers is eliminated, whereby a wafer having a uniform surface can be obtained even when CMP is conducted to remove the insulating film on a wafer having diffusion layers and trenches formed thereon.

Further, fill cells in the present invention are arranged after primitive cells have been arranged and before mask data are made, and the arithmetic processes for making mask data can therefore be reduced.

In the present invention, a plurality of types of fill cells having different sizes are prepared and then arranged in vacant areas that are generated in the element formation area after all primitive cells have been arranged, this arrangement process proceeding in order of size, starting from the largest fill cells that can be arranged in vacant areas. These processes reduce trouble of the arrangement process of the fill cells. In addition, the above-described plurality of types of fill cells are each identified by identifiers having the same amount of information. This method prevents increase in the amount of calculation when making mask data from a layout pattern.

Finally, in the present invention, each of the constituent elements of a semiconductor device are grouped in advance so as to make constituent elements having related operations belong to the same group. Group information that indicates the type of groups is given to each constituent element in that group. Reference is made to this group information when producing the layout pattern of a semiconductor device, the primitive cells associated with constituent elements of the same groups are arranged in proximity. This makes it possible to shorten wiring between constituent elements, reduce the wiring capacitance, and obtain a semiconductor device that operates at higher speed.

The above add other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
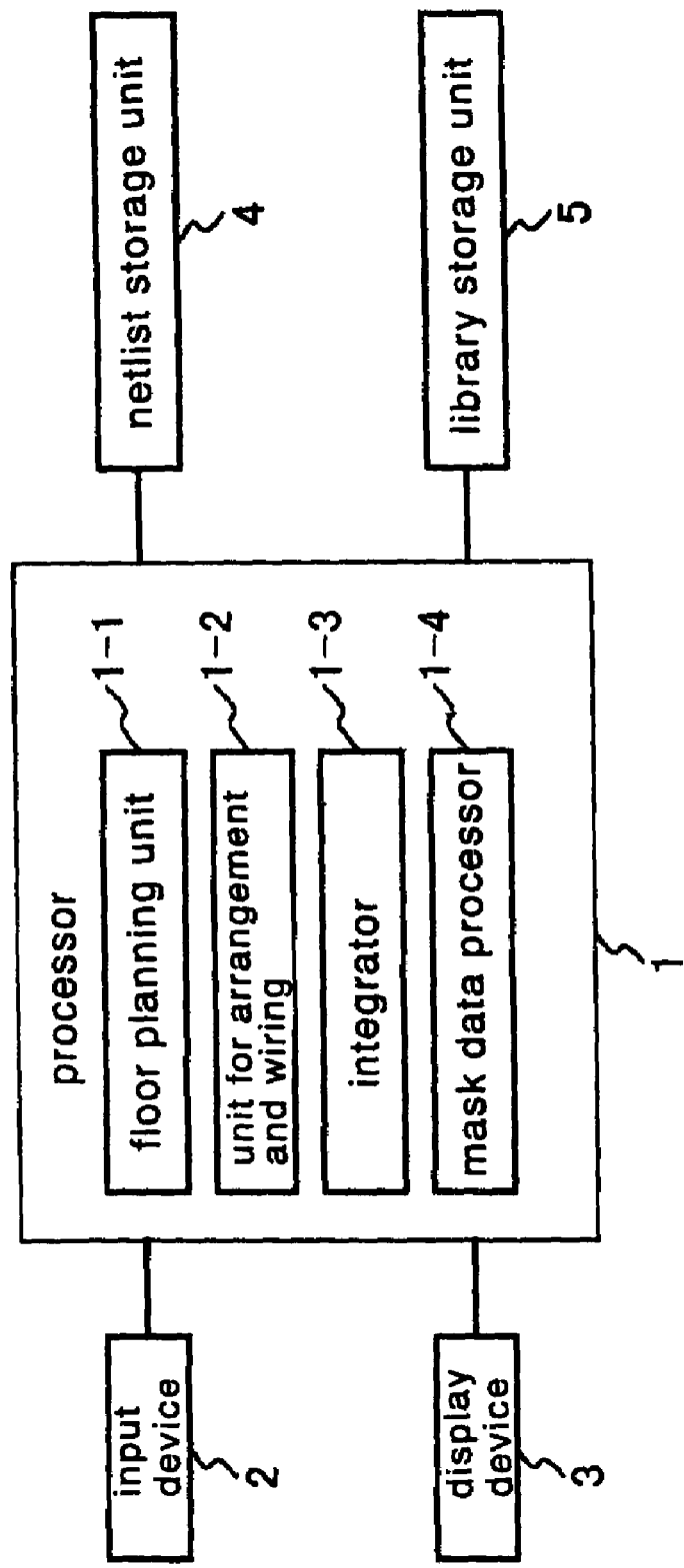
FIG. 1 is a block diagram showing an embodiment of a device for producing a layout pattern according to the present invention.

As shown in FIG. 1, the device and for producing a layout pattern of the present invention comprises processor 1, input device 2, display device 3, netlist storage unit 4, and library storage unit 5.

Processor 1 comprises floor planning unit 1-1, unit for arrangement and wiring 1-2, integrator 1-3, and mask data processor 1-4. Processor 1 may consist of, for example, a computer that, in accordance with a program, executes processing for producing the layout pattern of the present invention described hereinbelow.

Processor 1 executes processing in accordance with a program that has been provided in advance, by commands supplied from input device 2 or the like, and the results of this processing are indicated by display device 3. In addition, processor 1 refers, as necessary, to data stored in netlist storage unit 4 and library storage unit 5.

Input device 2 is used for supplying data and commands as input to processor 1.

Display device 3 is controlled by processor 1 and indicates, for example, the processing results of the above-described processor 1 or a request for input of data and commands in a screen or the like. Netlist storage unit 4 stores a netlist that indicates the circuit configuration of the semiconductor device to be fabricated. The netlist is made up of data that show constituent elements of a semiconductor device and connection relation thereof. These constituent elements includes single-unit constituent elements such as resistors, capacitors, and transistors as well as circuit constituent elements such as logic circuits, CPUs, and PLL circuits comprising a plurality of single-unit constituent elements.

In accordance with instructions from an operator that are supplied as input by way of input device 2, each of the constituent elements whose data are stored in netlist storage unit 4 are grouped in advance. Each group contains constituent elements having related operations, such as constituent elements sending and/or receiving a signal each other, and constituent elements that are necessary for realizing specific functions. At this time, data of each constituent element are stored in netlist storage unit 4 in correspondence with group information that indicates the group to which the constituent element belongs.

Library storage unit 5 stores data for primitive cells, which are circuit patterns associated with various constituent elements, and data for fill cells, which are circuit patterns for filling vacant areas in which primitive cells have not been arranged. Primitive cells include circuit patterns associated with the above-described single-unit constituent elements and circuit patterns associated with various circuit constituent elements.

Figure 2A:
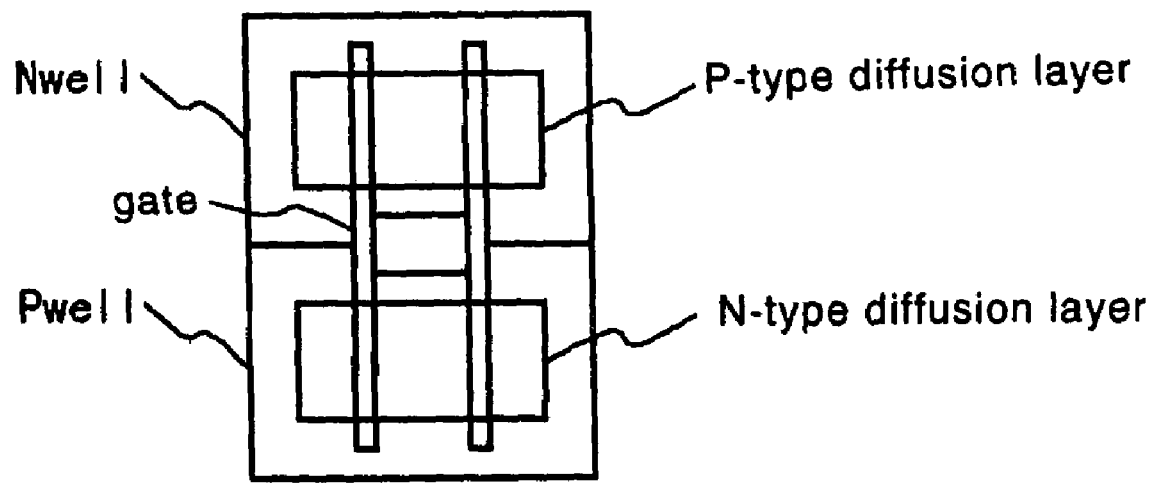
FIG. 2A is a plan view showing an example of the construction of a unit primitive cell.

FIG. 2A shows an example of a primitive cell. FIG. 2A shows the configuration of one unit primitive cell.

As shown in FIG. 2A, a unit primitive cell is made up of, for example, an n-well region with a p-type diffusion layer and a p-well region with an n-type diffusion layer. Two gate electrodes are provided over the p-type diffusion layer and the n-type diffusion layer for connecting these two diffusion layers. A primitive cell associated with a circuit constituent element such as a CPU or PLL circuit is formed by combining a plurality of unit primitive cells of this type.

Figure 2B:
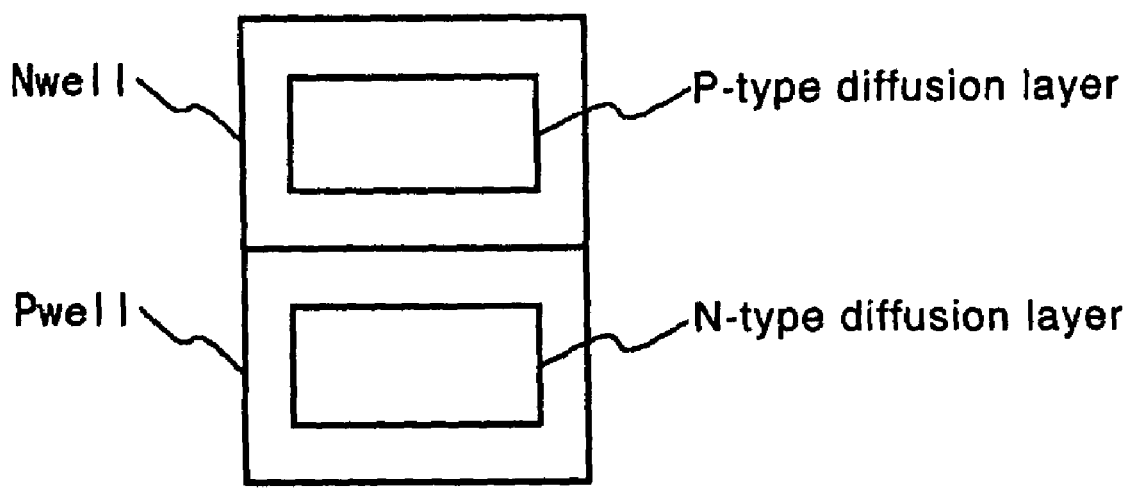
FIG. 2B is a plan view showing an example of the construction of a unit fill cell.

FIG. 2B shows an example of a fill cell. FIG. 2B shows the configuration of one unit fill cell.

As shown in FIG. 2B, a unit fill cell is made up of, for example, an n-type well region with a p-type diffusion layer and a p-type well region with an n-type diffusion layer. In contrast to a primitive cell, a fill cell has a construction without gate electrodes.

As the data of fill cells, library storage unit 5 may store only data of a unit fill cell. However, data of composite fill cells formed by combining a plurality of unit fill cells are also stored in advance in library storage unit 5, preferably. In addition, data of composite fill cells having various sizes are preferably stored in advance. In this way, composite fill cells of the optimum size can be arranged to match the size of vacant areas that are generated after primitive cells have been arranged, and the processing speed for arranging fill cells can be improved.

In the present invention, large composite fill cell and small unit fill cell are managed by identification numbers having the same amount of information. This approach prevents increase in the amount of calculation when making mask data from a layout pattern in a subsequent step, and further, prevents increase in the time needed for making mask data.

Floor planning unit 1-1 of processor 1 determines the position and size of pads arranged on a chip for the input and output of the power supply and signals. Floor planning unit 1-1 also determines connections between pads and power supply wiring patterns as well as connections between pads and I/O units that are made up by, for example, input/output buffers.

Unit for arrangement and wiring 1-2 refers to netlist storage unit 4 and selects the constituent elements to be arranged and obtain their group information. Unit for arrangement and wiring 1-2 also refers to library storage unit 5 and obtains data of the primitive cells associated with the selected constituent elements and arranges these primitive cells in vacant areas in the element formation area.

Unit for arrangement and wiring 1-2 also checks the existence of group information stored therein, associated with the selected constituent elements. When no group information exists, unit for arrangement and wiring 1-2 selects the next constituent element to be arranged. When group information exists, unit for arrangement and wiring 1-2 selects constituent elements corresponding to the group information, refers to library storage unit 5 to obtain data of the primitive cells associated with these constituent elements, and arranges these primitive cells in proximity to the primitive cells previously arranged.

After completing the arrangement of primitive cells associated with all constituent elements of a semiconductor device, unit for arrangement and wiring 1-2 next arranges fill cells in vacant areas in the element formation area in which primitive cells have not been arranged. After completing the arrangement of fill cells, unit for arrangement and wiring 1-2 refers to netlist storage unit 4 and carries out wiring between primitive cells that have been previously arranged.

Integrator 1-3 integrates the circuit patterns of each layer of the semiconductor device formed by unit for arrangement and wiring 1-2 to complete the layout pattern in the element formation area. The layout pattern data produced by integrator 1-3 may be in a layout format showing actually arrangement each constituent element, and also may be in a format of combination of identifiers for identifying primitive cells and fill cells. Although the layout format simplifies the processing of subsequent steps, this layout format results in an increase in the amount of layout pattern data. On the other hand, the format of combination of identifiers reduces the amount of layout pattern data, but results in more complex processing in subsequent steps.

Based on the layout pattern produced by integrator 1-3, mask data processor 1-4 makes mask data for producing the various reticles to be used in fabricating a semiconductor device. A layout pattern in which unit fill cells are used to fill vacant areas results in an increase in the amount of calculation for producing mask data. On the other hand, a layout pattern in which composite fill cells are used to fill vacant areas results in a decrease in the amount of calculation for producing mask data.

Figure 3:
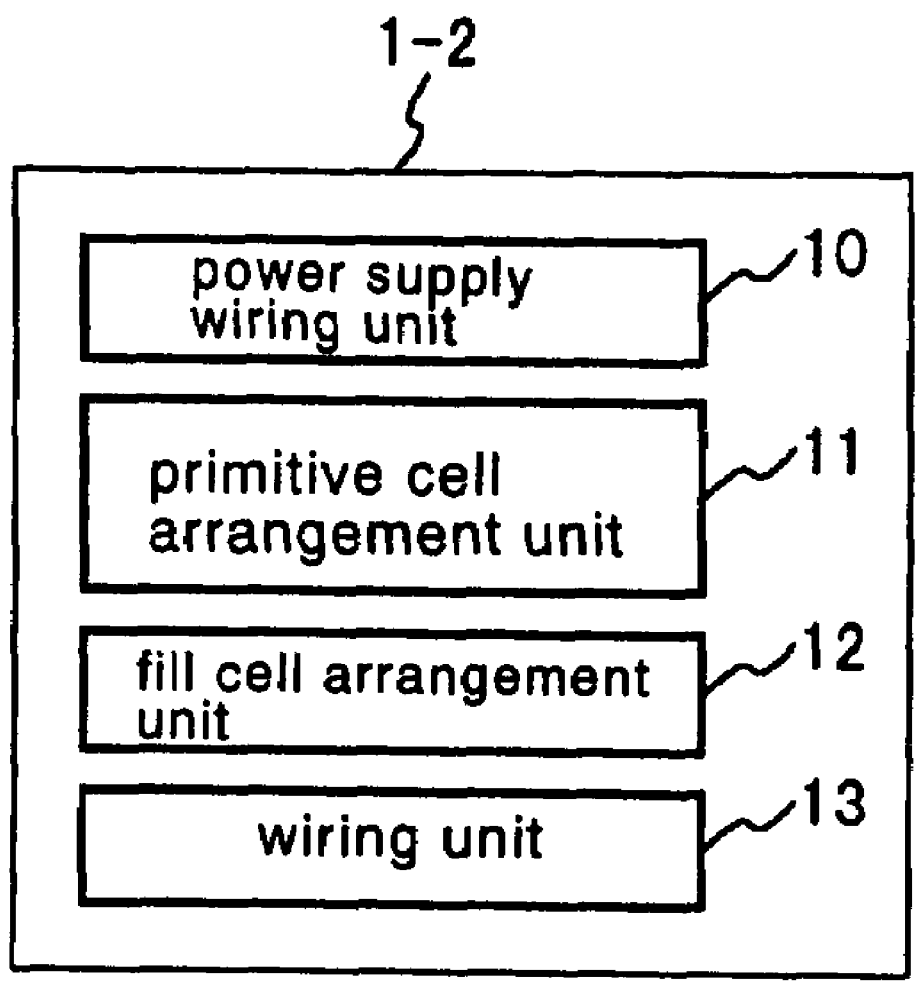
FIG. 3 is a block diagram showing the configuration of a unit for arrangement and wiring shown in FIG. 1.

Referring now to FIG. 3, explanation next regards the details of unit for arrangement and wiring 1-2 shown in FIG. 1.

As shown in FIG. 3, unit for arrangement and wiring 1-2 comprises power supply wiring unit 10, primitive cell arrangement unit 11, fill cell arrangement unit 12, and wiring unit 13.

Power supply wiring unit 10 making the power supply wiring pattern.

Primitive cell arrangement unit 11 refers to netlist storage unit 4 and selects the constituent elements to be arranged and obtain the group information of these constituent elements. The selected constituent elements include single-unit constituent elements such as resistors, capacitors, and transistors and circuit constituent elements such as logical circuits, CPU, and PLL circuits. Primitive cell arrangement unit 11 refers to library storage unit 5 and obtains primitive cells associated with the selected constituent elements. Primitive cell arrangement unit 11 arranges the primitive cells in vacant areas in the element formation area. Primitive cell arrangement unit 11 further checks the existence of group information of the selected constituent elements stored therein. If no group information exists, primitive cell arrangement unit 11 selects the next constituent elements to be arranged. However, if group information exists, primitive cell arrangement unit 11 selects constituent elements associated with the group information. Primitive cell arrangement unit 11 then refers to library storage unit 5 and obtains the data of primitive cells associated with these constituent elements and arranges these primitive cells in proximity to the previously arranged primitive cells. This selection of constituent elements to be arranged based on group information and the arrangement of these constituent elements in proximity not only shortens the wiring distance between constituent elements having related operation but also reduces the wiring capacitance. Thus, it is possible to obtain a semiconductor device that operates at higher speed.

Upon completing the arrangement of primitive cells associated with all constituent elements of the semiconductor device, fill cell arrangement unit 12 detects vacant areas that are generated in the element formation area in which primitive cells have not been arranged, and arranges fill cells in the detected vacant areas. When only data of a unit fill cell are stored in library storage unit 5, fill cell arrangement unit 12 fills all vacant areas with unit fill cells. Alternatively, when data of a plurality of types of fill cells having different sizes are stored in library storage unit 5, fill cell arrangement unit 12 first arranges the largest composite fill cell that can be arranged within a vacant area, and then arranges the largest fill cell that can be arranged inside the remaining vacant area. Fill cell arrangement unit 12 can efficiently fill all vacant areas by subsequently repeating the same process.

When the arrangement of fill cells by fill cell arrangement unit 12 has been completed, wiring unit 13 carries out wiring between primitive cells that have been arranged.

Figure 4A:
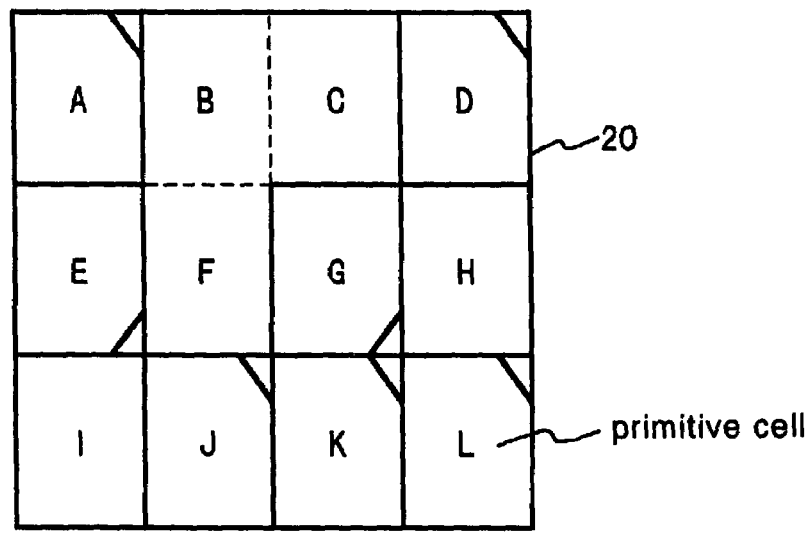
FIG. 4A is a plan view showing an example of the arrangement of primitive cells.
Figure 4B:
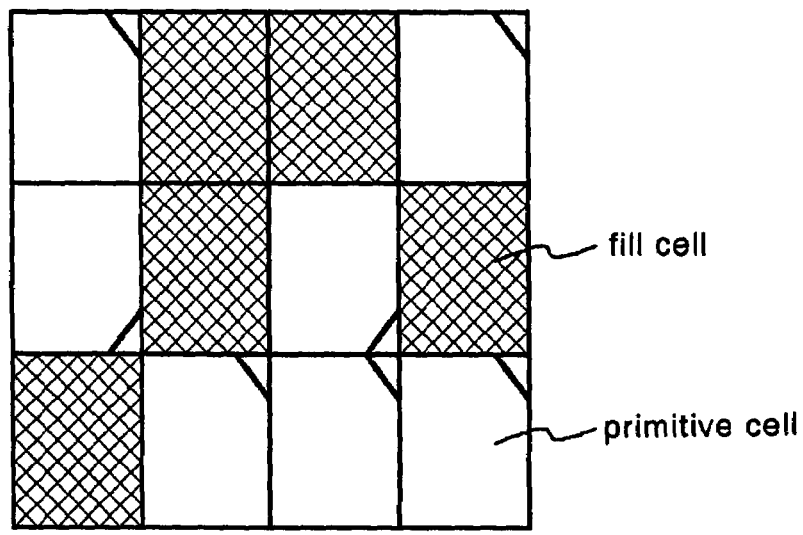
FIG. 4B is a plan view showing an example of the arrangement of fill cells.
Figure 4C:
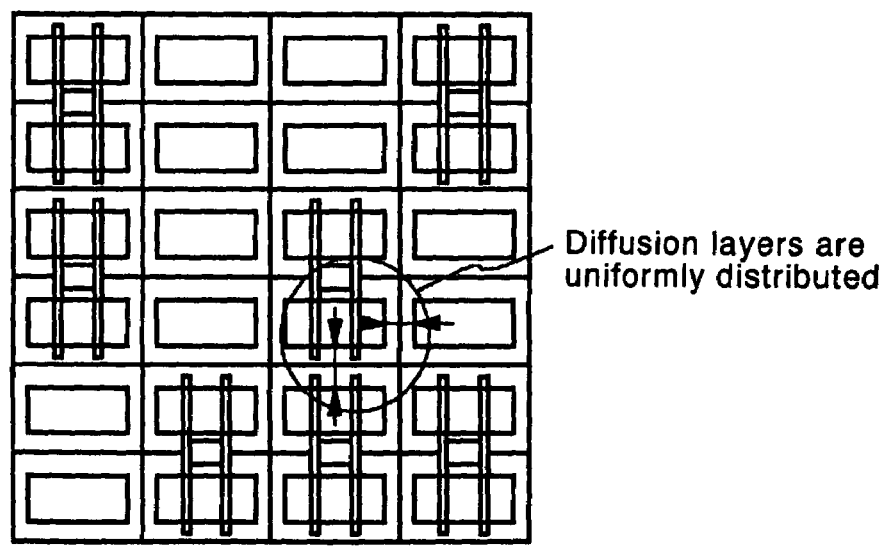
FIG. 4C is a plan view showing an example of a layout pattern produced by the present invention.

Referring now to FIG. 4, explanation next regards the procedures of producing a layout pattern of the present invention by unit for arrangement and wiring 1-2 shown in FIG. 1. The element formation area of semiconductor device is assumed to be divided into a plurality of areas 20 of any size, and FIGS. 4A-4C show the construction of one area 20 among these areas. Area 20 is made up of grids A-L. Data of primitive cells associated with each of the constituent elements of the semiconductor device to be fabricated, unit fill cell and composite fill cell consisting of combination of two unit fill cells have been stored in advance in library storage unit 5.

Primitive cell arrangement unit 11 of unit for arrangement and wiring 1-2 first refers to netlist storage unit 4 and selects the constituent elements to be arranged.

Primitive cell arrangement unit 11 of unit for arrangement and wiring 1-2 next refers to library storage unit 5, obtains data of primitive cells associated with the selected constituent elements, and arranges the primitive cells in vacant areas of area 20. In this example, primitive cells are arranged in grids A, D, E, C, J, K, and L.

Upon completion of the arrangement of primitive cells, fill cell arrangement unit 12 of unit for arrangement and wiring 1-2 searches vacant areas in area 20, and detects that grids B, C, F, H, and I are vacant areas, as shown in FIG. 4B. Because grids B and C are a continuous area, fill cell arrangement unit 12 obtains from library storage unit 5 the data of the composite fill cell of combination of two unit fill cells, and arranges the composite fill cell in grids B and C. Since grids F, H, and I are single grids, fill cell arrangement unit 12 obtains from library storage unit 5 the data for unit fill cell and arranges these unit fill cells in grids F, H, and I.

As a result of these procedures, primitive cells or fill cells are arranged in all of the grids of area 20, as shown in FIG. 4C, and diffusion layers are thus uniformly arranged over area 20.

In the example shown in FIGS. 4A-4C, a composite fill cell is arranged in grids B and C. Arrangement of fill cells can be executed at high speed by preparing in advance composite fill cells of combination of a plurality of unit fill cells. However, storing only data of a unit fill cell in library storage unit 5, while slowing the arrangement of fill cells, simplifies the control procedures for arranging fill cells.

Although an example was shown in FIGS. 4A-4C in which primitive cells or fill cells were arranged in all grids of area 20, fill cells need not be arranged in all vacant grids after the arrangement of primitive cells. In such a case, the proportion of the diffusion layers distributed in the element formation area of a semiconductor device, i.e., the distribution ratio of the diffusion layers, need only fall within a prescribed range in all of the areas. Specifically, the above-described problems can be reliably prevented from occurring in processing of a wafer surface, if the distribution ratio of diffusion layers falls within the range of 30-55%.

When the arrangement of fill cells and primitive cells associated with all constituent elements of a semiconductor device has been completed by unit for arrangement and wiring 1-2, integrator 1-3 of processor 1 integrates the circuit patterns of each layer of the semiconductor device formed by unit for arrangement and wiring 1-2 to complete the layout pattern in the element formation area.

Further, mask data processor 1-4 of processor 1 produces mask data for fabricating reticles from the layout pattern produced by integrator 1-3. Reticles are fabricated using mask data produced by mask data processor 1-4, and these reticles are used for fabricating a wafer.

Explanation next regards the wafer fabrication process with reference to FIG. 5.

Figure 5A:
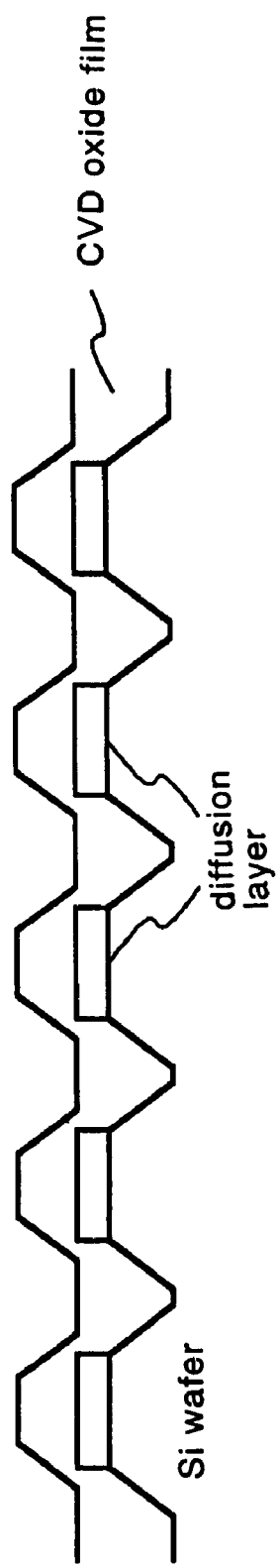
FIG. 5A is a sectional view showing a wafer on which diffusion layers and trenches are formed and then an oxide film is formed.

In the wafer fabrication process, a resist pattern is formed on a wafer composed of a material such as silicon, by using a reticle, and a diffusion layer is formed by implanting impurity ions using the resist pattern as shown in FIG. 5A. A resist pattern having prescribed openings between diffusion layers is formed by using a reticle, and then the positions of these openings are etched to form trenches for isolating each element.

An oxide film (insulating film) is formed over the entire surface of the wafer including the interior of the trenches by CVD method, whereby differences in level are produced in the surface of the oxide film, the surface of the oxide film being high at positions where the diffusion layers are present and low at positions where trenches have been formed.

Figure 5B:
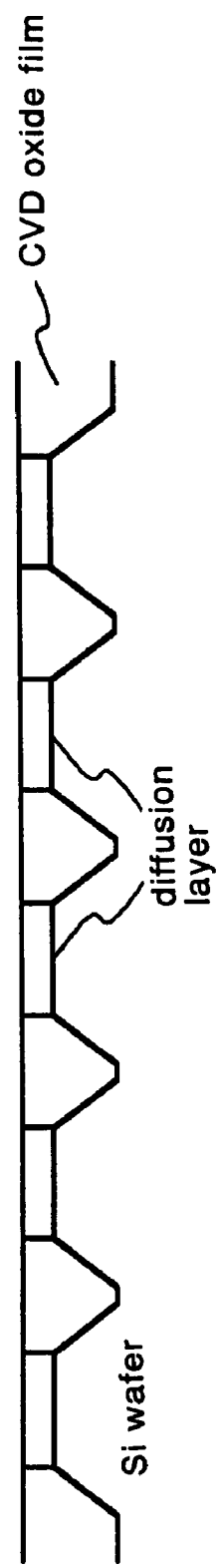
FIG. 5B is a sectional view showing a wafer after the CMP process.

CMP is carried out to eliminate this unevenness of the oxide film, and the wafer is ground until the surface of the diffusion layer is exposed. As a result, a wafer having a planarized surface can be obtained, as shown in FIG. 5B.

If the diffusion layers are unevenly distributed on the wafer surface, the wafer surface will undergo excessive abrasion in areas having few diffusion layers. However, in the present invention, fill cells are arranged in vacant areas in which primitive cells have not been arranged to produce a substantially uniform distribution of diffusion layers, and the wafer surface can therefore be uniformly ground. The wafer is then used to fabricate semiconductor devices.

As described above, in the present invention, fill cells having diffusion layers are arranged in vacant areas in which primitive cells have not been arranged such that the distribution ratio of diffusion layers falls within a prescribed range. As a result, a wafer having a uniform surface can be obtained even when CMP is carried out before forming transistors.

In addition, fill cells are arranged after primitive cells have been arranged but before mask data are made, whereby trouble of arithmetic process can be reduced when producing mask data.

Finally, when arranging fill cells, the use of both unit fill cell and a variety of composite fill cells of combination of a plurality of unit fill cells enables the vacant areas that are generated after primitive cells have been arranged to be efficiently filled by fill cells. In addition, the use of the same amount of information to designate both unit fill cell and composite fill cell prevents an increase in the amount of calculation when producing mask data from a layout pattern.

While a preferred embodiment of the present invention has been described using specific terms, such description is for illustrative purposes only, and it is to be understood that changes and variations may be made without departing from the spirit or scope of the following claims.

What is claimed is:

1. A method of fabricating a semiconductor device in which diffusion layers and trenches for isolating elements are formed on a wafer, following which an insulating film is formed over the entire surface of said wafer including the interior of said trenches, and said insulating film is ground to planarize the surface of said wafer, said method comprising:
   forming primitive cells having circuit patterns of constituent elements of said semiconductor device in the element formation area of said semiconductor device; and
   forming at least one fill cell with a diffusion layer and no wiring, in a vacant area that is to be generated forming said primitive cells.

2. A method according to claim 1, wherein said fill cell is formed such that said diffusion layers are uniformly distributed in said element formation area of said semiconductor device.

3. A method according to claim 1, wherein said fill cell is formed such that the distribution ratio falls within the range 30-55% in said element formation area, said distribution ratio being the proportion of said diffusion layers that are distributed in said element formation area of said semiconductor device.

4. A method according to claim 1, wherein:
   said constituent elements are grouped such that constituent elements having related operations are sorted into the same group; and
   said primitive cells associated with constituent elements that belong to the same group are formed in proximity.

5. A method according to claim 1, further comprising:
   forming an insulating film on a surface of a semiconductor substrate after a diffusion layer is formed; and
   planarizing the surface of a semiconductor substrate by a CMP (Chemical Mechanical Polishing) process by using the diffusion layer of a primitive cell and a fill cell as a stopper.

* * * * *